United States Patent
Sato

(10) Patent No.: US 9,974,012 B2
(45) Date of Patent: May 15, 2018

(54) COMMUNICATION APPARATUS AND COMMUNICATION SYSTEM

(71) Applicant: CANON KABUSHIKI KAISHA, Tokyo (JP)

(72) Inventor: Ryosuke Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/648,307

(22) Filed: Jul. 12, 2017

(65) Prior Publication Data

US 2017/0311248 A1 Oct. 26, 2017

Related U.S. Application Data

(63) Continuation of application No. 15/022,189, filed as application No. PCT/JP2014/004653 on Sep. 10, 2014, now Pat. No. 9,723,550.

(30) Foreign Application Priority Data

Sep. 18, 2013 (JP) .................................. 2013-193041

(51) Int. Cl.
| | |
|---|---|
| H04B 5/00 | (2006.01) |
| H04W 48/18 | (2009.01) |
| H04N 1/00 | (2006.01) |
| H04W 12/06 | (2009.01) |
| H04W 36/00 | (2009.01) |

(Continued)

(52) U.S. Cl.
CPC ........ *H04W 48/18* (2013.01); *H04N 1/00127* (2013.01); *H04W 12/06* (2013.01); *H04W 36/0066* (2013.01); *H04W 36/0055* (2013.01); *H04W 36/0072* (2013.01); *H04W 36/14* (2013.01); *H04W 84/12* (2013.01)

(58) Field of Classification Search
CPC ... H04W 48/18; H04W 12/06; H04N 1/00127
USPC ................................................. 455/41.1, 41.2
See application file for complete search history.

(56) References Cited

U.S. PATENT DOCUMENTS

| | | | | |
|---|---|---|---|---|
| 2009/0227282 | A1* | 9/2009 | Miyabayashi | ...... H04L 63/0492 455/552.1 |
| 2012/0013927 | A1* | 1/2012 | Asai | ...................... G06F 3/1204 358/1.13 |

(Continued)

FOREIGN PATENT DOCUMENTS

| | | |
|---|---|---|
| EP | 2026615 A2 | 2/2009 |
| JP | 2013214139 A | 10/2013 |

*Primary Examiner* — Raj Chakraborty
(74) *Attorney, Agent, or Firm* — Canon U.S.A., Inc. IP Division

(57) ABSTRACT

A communication apparatus includes first communication means for performing a wireless communication with another communication apparatus in a first communication method, second communication means for performing the wireless communication with another communication apparatus in a second communication method that is different from the first communication method, and sending means for sending a request message for requesting, by using the first communication means, a connection parameter for connecting to another communication apparatus via the second communication means, the request message including information about a communication service executable by the communication apparatus.

16 Claims, 11 Drawing Sheets

(51) Int. Cl.
*H04W 36/14* (2009.01)
*H04W 84/12* (2009.01)

(56) References Cited

U.S. PATENT DOCUMENTS

2012/0250938 A1* 10/2012 DeHart .................. G08G 1/127
382/103
2012/0262753 A1* 10/2012 Viccari .............. H04N 1/00307
358/1.15
2013/0215467 A1* 8/2013 Fein ...................... G06F 3/1204
358/1.15

* cited by examiner

COMMUNICATION APPARATUS AND COMMUNICATION SYSTEM

RELATED APPLICATIONS

The present application is a Continuation of U.S. patent application Ser. No. 15/022,189 filed on Mar. 15, 2016, as a National Stage application pursuant to 35 U.S.C. 371, which claims the benefit of PCT/JP2014/004653 filed Sep. 10, 2014, and Japanese Patent Application No. 2013-193041 filed Sep. 18, 2013. The above applications are hereby incorporated by reference herein in their entirety.

TECHNICAL FIELD

The present invention relates to a communication technology.

BACKGROUND ART

In recent years, cellular phones and the like have begun using proximity wireless communications, including the near field communication (NFC), the Infrared Data Association (IrDA) communication, TransferJet (registered trademark), etc. Such a proximity wireless communication allows a user to have data transmission between apparatuses merely by closely placing the apparatuses to each other. Furthermore, there is a technology for the handover from a proximity wireless communication as mentioned above to a different wireless communication method, such as a wireless local-area-network (LAN) communication (Institute of Electrical and Electronics Engineers (IEEE) 802.11 series), a Bluetooth (registered trademark) communication, etc. (See Japanese Patent Application Laid-Open No. 2011-193474).

On the other hand, there exist communication protocols (service discovery protocols) for allowing a communication appliance to search for a service that another communication appliance provides or allowing a communication appliance to notify another communication appliance of the service that the communication appliance provides. Examples of such protocols include the Simple Service Discovery Protocol (SSDP), the multicast Domain Name System (mDNS), etc.

CITATION LIST

Patent Literature

[PTL 1]
Japanese Patent Application Laid-Open No. 2011-193474

SUMMARY OF INVENTION

According to one aspect of the present invention, a communication apparatus includes, first communication means for performing a wireless communication with another communication apparatus in a first communication method, second communication means for performing the wireless communication with another communication apparatus in a second communication method that is different from the first communication method, and sending means for sending a request message for requesting by using the first communication means, a connection parameter for connecting to another communication apparatus via the second communication means, the request message including information about a communication service.

DESCRIPTION OF EMBODIMENTS

A service discovery protocol, such as the SSDP and the mDNS, is usually performed by using the communication method after the handover is carried out, such as a wireless LAN communication or the like. Therefore, an apparatus that carries out a handover recognizes that a communication partner apparatus is not capable of executing a desired communication service, after sending and receiving information about the wireless LAN in the NFC communication and carrying out the handover to, for example, the wireless LAN. Hence, although the handover has been carried out, when the apparatus performs the service discovery protocol after connecting to the wireless LAN, there is a possibility that the connected communication partner cannot execute the desired communication service and an unnecessary handover process is executed.

In exemplary embodiments described below, communication partner apparatuses share information about services before a handover is carried out.

Figure 1:
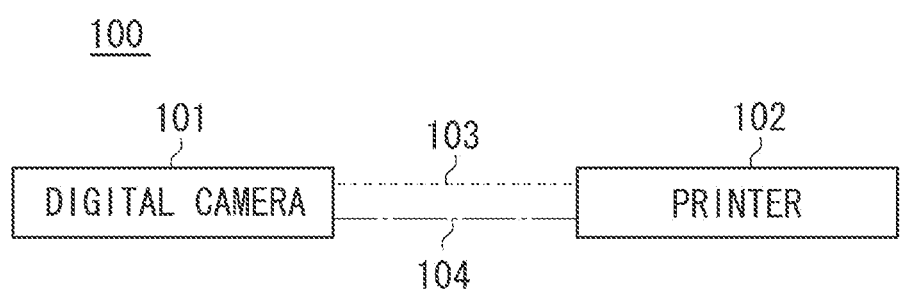
FIG. 1 illustrates an example of a system construction according to an exemplary embodiment of the present invention.

Hereinafter, communication apparatuses and communication systems according to the exemplary embodiments will be described in detail with reference to the drawings. FIG. 1 illustrates an appliance construction of a system 100 assumed in the exemplary embodiment described below. Communication apparatuses 101 and 102 according to the exemplary embodiment of the present invention are a digital camera 101 and a printer 102, respectively. The digital camera 101 and the printer 102 are capable of communicating with each other by using an NFC communication 103 and a wireless LAN communication 104.

Figure 2:
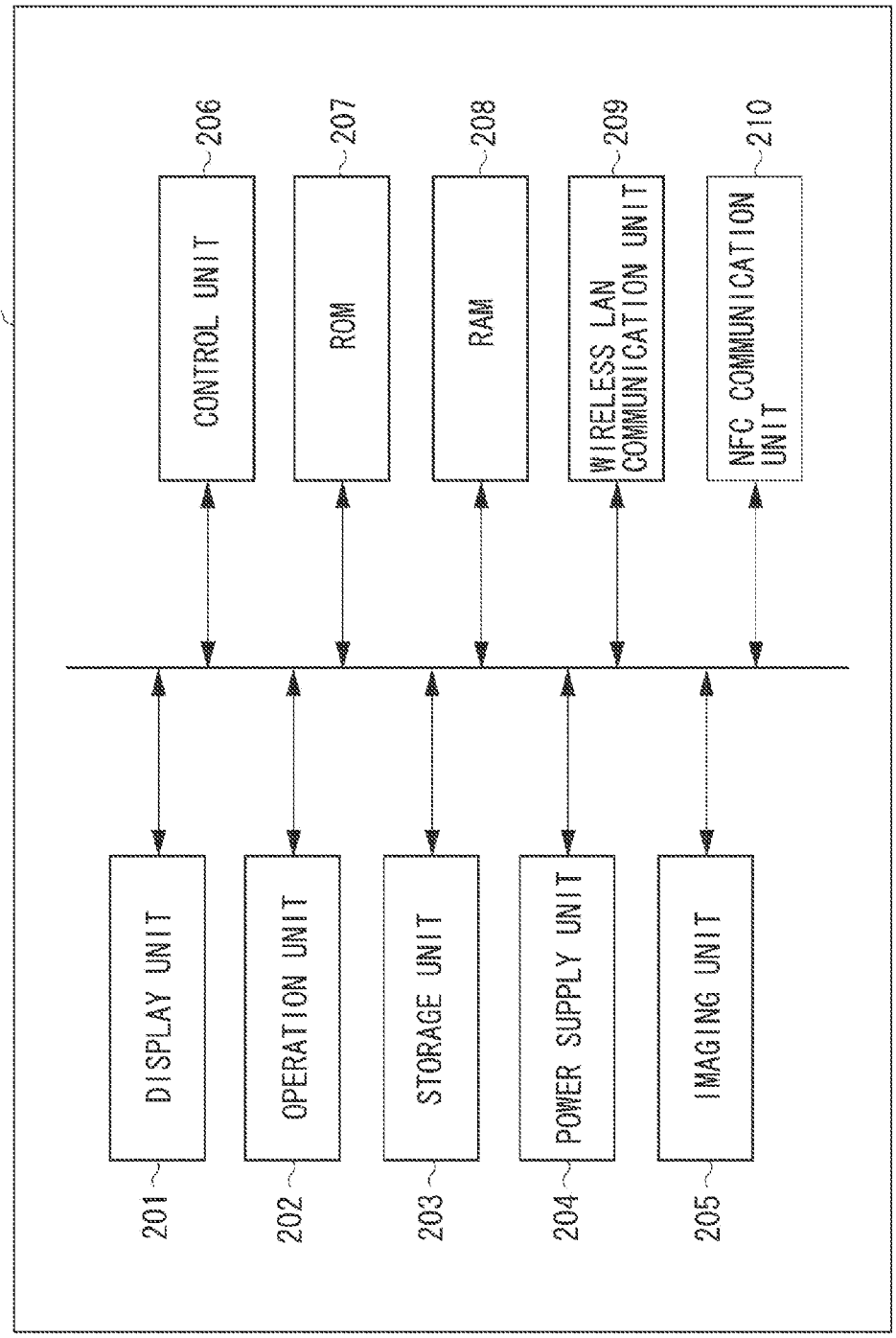
FIG. 2 illustrates an example of a hardware construction of a communication apparatus (digital camera) according to the exemplary embodiment.

FIG. 2 illustrates a hardware construction of the digital camera 101.

The digital camera 101 is equipped with a display unit 201, an operation unit 202, a storage unit 203, a power supply unit 204, an imaging unit 205, a control unit 206, a read-only memory (ROM) 207, a random access memory (RAM) 208, a wireless LAN communication unit 209, and an NFC communication unit 210.

The display unit 201 is constructed of, for example, an LCD or an LED, has a function of outputting visually recognizable information, and displays a user interface (UI) in conjunction with applications. The operation unit 202 has a function of allowing a user to enter various inputs so as to operate the communication apparatus. The storage unit 203 is constructed of, for example, a hard disk drive (HDD), and stores and manages various kinds of data such as wireless communication network information, data send/receive information, or image data. The power supply unit 204 is, for example, a battery, and retains a power supply for operating the entire apparatus, and supplies electric power to various hardware elements. The imaging unit 205 is constructed of an image sensor, a lens, etc., and takes photographs and moving images. The control unit 206 is, for example, a central processing unit (CPU), and controls operations of various component elements of the digital camera 101. The ROM 207 stores control commands, namely programs. Various operations described below are realized by the control unit 206 executing control programs stored in the ROM 307. The RAM 208 is used, for example, as a work memory at the time of execution of a program, a temporary storage of data, etc. A wireless LAN communication unit 209 performs the wireless LAN communication 104. The wireless LAN communication unit 209 performs a wireless communication based on the IEEE 802.11 series. Although in this exemplary embodiment, the wireless LAN communication unit 209 performs the wireless communication based on the IEEE 802.11 series, other communication methods, such as the Bluetooth (registered trademark) communication, may also be used. An NFC communication unit 210 performs the NFC communication 103. The NFC communication unit 210 performs a wireless communication based on the communication regulations prescribed by the Near Field Communication (NFC) Forum. Furthermore, the NFC communication unit 210 automatically establishes the NFC communication 103 if NFC communication unit 210 detects an apparatus capable of communication, within a communication range. Although in this exemplary embodiment, the NFC communication unit 210 performs the wireless communication based on the NFC, the NFC communication unit 210 may use a communication method as long as its communication distance is shorter than the communication distance of the communication method that the wireless LAN communication unit 209 uses. Furthermore, the NFC communication unit 210 may use a communication method as long as its communication speed is slower than the communication speed of the communication method used by the wireless LAN communication unit 209. For example, the Bluetooth Low Energy (BLE) method prescribed by Bluetooth 4.0 may be used.

Figure 3:
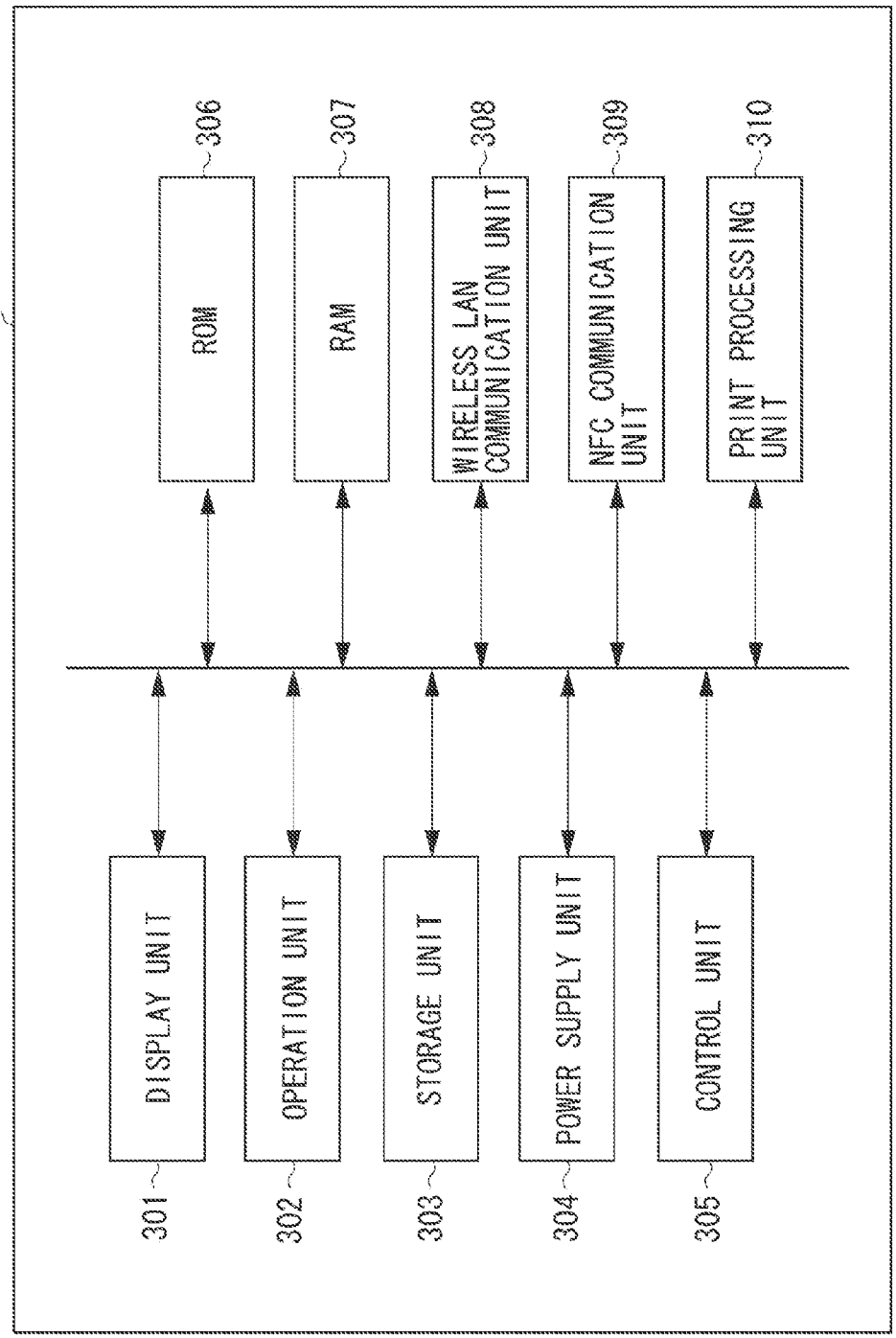
FIG. 3 illustrates an example of a hardware construction of a communication apparatus (printer) according to the exemplary embodiment.

FIG. 3 illustrates a hardware construction of the printer 102. The printer 102 is equipped with a print processing unit 310 instead of the imaging unit 205 of the digital camera 101. The print processing unit 310 prints image data stored in a storage unit 303. Other component portions are substantially the same as those of the digital camera 101, and therefore descriptions thereof are omitted.

Next, with reference to FIG. 4 and FIG. 5, functional block constructions of the digital camera 101 and the printer 102 will be described. In this exemplary embodiment, the functional blocks of the digital camera 101 and the printer 102 are stored as programs in the ROM 207 and the ROM 307, respectively, and the functions of the functional blocks are implemented by the control unit 206 and the control unit 305 executing the programs. The control units 206 and 305 carry out various hardware controls and also the computing and processing of information according to control program, to realize various functions. The functional blocks may be partly or entirely provided as hardware constructions. In that case, the functional blocks are partly or entirely constructed, for example, of application specific integrated circuits (ASICs).

Figure 4:
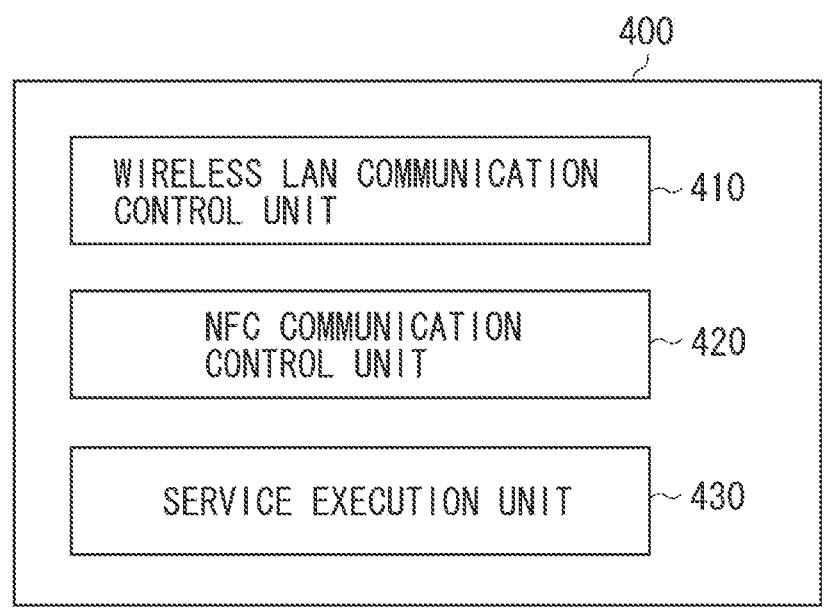
FIG. 4 is a functional block diagram illustrating an example of the construction of a communication apparatus (digital camera) according to the exemplary embodiment.

FIG. 4 is a functional block diagram (400) of the digital camera 101. The digital camera 101 is equipped with a wireless LAN communication control unit 410, an NFC communication control unit 420, and a service execution unit 430.

The wireless LAN communication control unit 410 is a processing unit that controls the wireless LAN communication performed via the wireless LAN communication unit 209. The wireless LAN communication control unit 410 is equipped with a station function for acting as a wireless LAN terminal, and an access point (AP) function for acting as an access point. The NFC communication control unit 420 is a processing unit that controls the NFC communication performed via the NFC communication unit 210. The service execution unit 430 is a processing unit that manages information about services provided by external appliances which can be executed by the digital camera 101 using the wireless LAN communication control unit 410 to execute the services. The service execution unit 430 manages identifiers of the services and the corresponding service execution procedures, information about options of the services, etc., as service information (information about services). The digital camera 101 in this exemplary embodiment is capable of executing two kinds of services that are a "print service A" and a "print service B".

Figure 5:
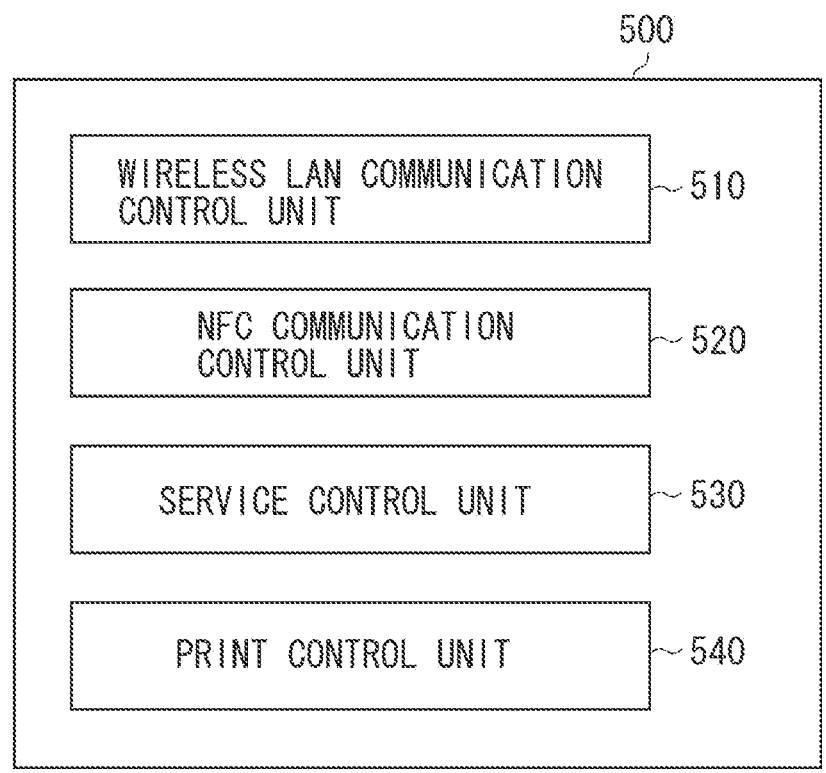
FIG. 5 is a functional block diagram illustrating an example of the construction of a communication apparatus (printer) according to the exemplary embodiment.

FIG. 5 is a functional block diagram (500) of the printer 102. The printer 102 is equipped with a wireless LAN communication control unit 510, an NFC communication control unit 520, a service control unit 530, and a print control unit 540.

The wireless LAN communication control unit 510 is a processing unit that controls the wireless LAN communication performed via the wireless LAN communication unit 308. The wireless LAN communication control unit 510 is equipped with a station function for acting as a wireless LAN terminal, and an AP function for acting as an access point. The NFC communication control unit 520 is a processing unit that controls the NFC communication performed via the NFC communication unit 309. The service control unit 530 is a processing unit that manages information about services that the printer 102 is capable of providing to external appliances via the wireless LAN communication control unit 510 to execute the services. The service control unit 530 manages identifiers of the services (communication services) and the corresponding service execution procedures, information about options of the services, etc., as service information. The printer 102 in this exemplary embodiment is capable of executing three kinds of services that are a "print service A", a "print service C", and a "print service D". The print control unit 540 is a function unit that controls the print processing performed by the print processing unit 310. The service control unit 530 can control the print control unit 540 according to a request from an external appliance, so as to print the print data received from the external appliance.

Operations of the communication system that has the above-described construction will be described.

With reference to flowcharts of FIG. 6 and FIG. 7, operation procedures of the digital camera 101 and the printer 102 in a first exemplary embodiment will be described.

Figure 6:
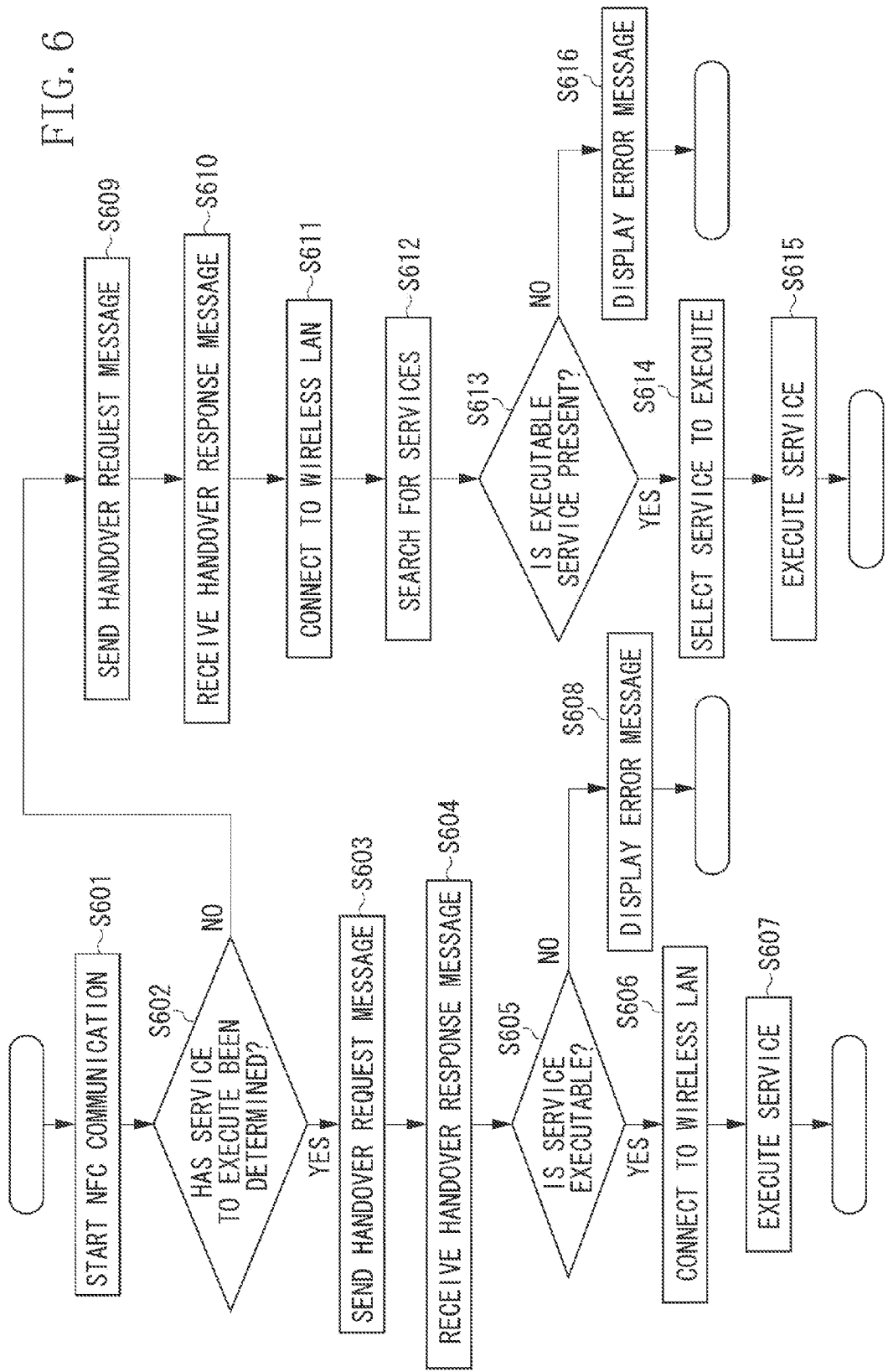
FIG. 6 illustrates an operation flow of a communication apparatus (digital camera) in a first exemplary embodiment.

The flowchart of FIG. 6 illustrates the operation procedure performed by the digital camera 101 when a user closely places the digital camera 101 and the printer 102 to each other.

In step S601, upon detecting that the NFC communication unit 309 of the printer 102 is present nearby, the NFC communication control unit 420 of the digital camera 101 establishes communication with the printer 102 in the NFC mode. Next, in step S602, the control unit 206 of the digital camera 101 determines whether a service desired to be executed between the digital camera 101 and the printer 102 has been determined. A determination of a service to be executed in this exemplary embodiment is made through the user's operation accepted by the operation unit 202. The determination in step S602 is made through the user's operation performed on the digital camera 101 up to the start of the NFC communication. More specifically, the determination in step S602 is carried out according to whether the service that the digital camera 101 is to execute has been selected at the time of connection to the printer 102 via the NFC communication unit 210.

If the service desired to be executed between the digital camera 101 and the printer 102 has been determined (YES in S602), the digital camera 101 determines in steps S603 to S608 whether it is possible to execute the service by using the NFC communication method. If the service to be executed between digital camera 101 and the printer 102 has not been determined (NO in S602), the digital camera 101 establishes connection to the printer 102 in the wireless LAN communication method in steps S609 to S616. Then, the digital camera 101 determines whether it is possible to execute the service by using the wireless LAN communication method.

If the service desired to be executed between the digital camera 101 and the printer 102 has been determined (YES in S602), the NFC communication control unit 420 sends, in step S603, a handover request message that contains information about an identifier of the service desired to be executed, to the printer 102 via the NFC communication unit 210. The identifier of the service mentioned herein is an integer value that is uniquely associated with each of the services, whose specifications are individually prescribed. Furthermore, the handover request message is a message requesting for a connection parameter that is required for the connection to the printer 102 in a communication method different from the NFC method. The handover request message may contain accompanying information about the service, and the like, in addition to the identifier of the service. For example, information about the encoding format for a file desired to be printed, the print sheet size, the print color, the presence or absence of two-sided printing, etc. may be added to the information that is to be sent.

Furthermore, the handover request message may contain information about a wireless communication interface that is used to execute the service. The information about the wireless communication interface indicates the communication method to which the user desires to execute a handover, and the wireless LAN or Bluetooth (registered trademark).

In the present exemplary embodiment, the digital camera 101 sends a handover request message that contains information indicating that the desired service mode is the "print service A", the desired connection type is the wireless LAN, and the file format desired for the printing is the Joint Photographic Experts Group (JPEG) format. Furthermore, in the present exemplary embodiment, the foregoing handover request message is a message that is prescribed by the NFC Forum Connection Handover Technical Specification.

Subsequently, in step S604, the NFC communication control unit 420 receives a handover response message from the printer 102 in the NFC communication method. Then, the NFC communication control unit 420 analyzes the content of the message. In this exemplary embodiment, the response message is a Handover Select message prescribed by the NFC Forum Connection Handover Technical Specification. Furthermore, the handover response message contains information that indicates whether the service included in the handover request message sent in step S603 can be executed by the printer 102. If the response message indicates that the service can be executed (YES in S605), the digital camera 101 connects, in step S606, to the wireless LAN network according to a connection parameter of the wireless LAN which is contained in the message. The connection parameter is information for connecting to a network that the printer 102 constructs as an access point. The connection parameter contains all or at least one of a service set identifier (SSID), an encryption key, an encryption method, an authentication key, an authentication method, a passphrase, and a media access control (MAC) address of the printer 102.

In step S607, the service execution unit 430 of the digital camera 101 executes the service, following the procedure of the service sent in step S603, after the digital camera 101 is connected to the wireless LAN network on the basis of the connection parameter that the wireless LAN communication unit 209 has acquired. The service execution unit 430 executes the service through the communication performed via the wireless LAN communication unit 308, in the wireless LAN network having the acquired connection parameter. Furthermore, if, according to the handover response message, it is determined that the service indicated in the handover request message cannot be executed (NO in S605), the service execution unit 430 displays, in step S608, in the display unit 201 a message indicating that the print processing has failed. Then, the process ends. The error notification method is not limited to display of a message. For example, an error may be notified by vibration of a main body of the digital camera 101, voice, the turning on of a light emitting diode (LED) lamp, etc.

On the other hand, if the service that the digital camera 101 is to execute has not been selected at the time of making the NFC connection to the printer 102 (NO in S602), the NFC communication control unit 420 sends, in step S609, the request message to the printer 102 in the NFC communication method, without including the service information in the request message. Subsequently, in step S610, the NFC communication control unit 420 receives the handover response message from the printer 102. Next, in step S611, the wireless LAN communication control unit 410 connects to the wireless LAN network, according to the connection parameter of the wireless LAN contained in the handover response message. In step S612, after the connection to the wireless LAN network is completed, the wireless LAN communication control unit 410 performs a service search process on the wireless LAN network to collect information about the services that communication apparatuses on the network support. This service search process is performed by using a communication protocol, for example, the Simple Service Discovery Protocol (SSDP), the multicast Domain Name System (mDNS), etc. If, as a result of the search process in step S612, a communication apparatus that supports an executable service is discovered (YES in S613), the service execution unit 430 selects the service in step S614. Then, in step S615, the service execution unit 430 executes the selected service. The selection process of step S614 is performed, for example, by the user selecting the name of the service. If the search process of step S612 does not discover a communication apparatus that supports an executable service (NO in S613), the service execution unit 430 displays, in step S616, in the display unit 201 a message indicating that the print processing has failed. Then, the process ends. As in step S608, the error notification method is not limited to display of a message. For example, an error may be notified by vibration of the main body of the digital camera 101, voice, the turning on of an LED lamp, etc.

Figure 7:
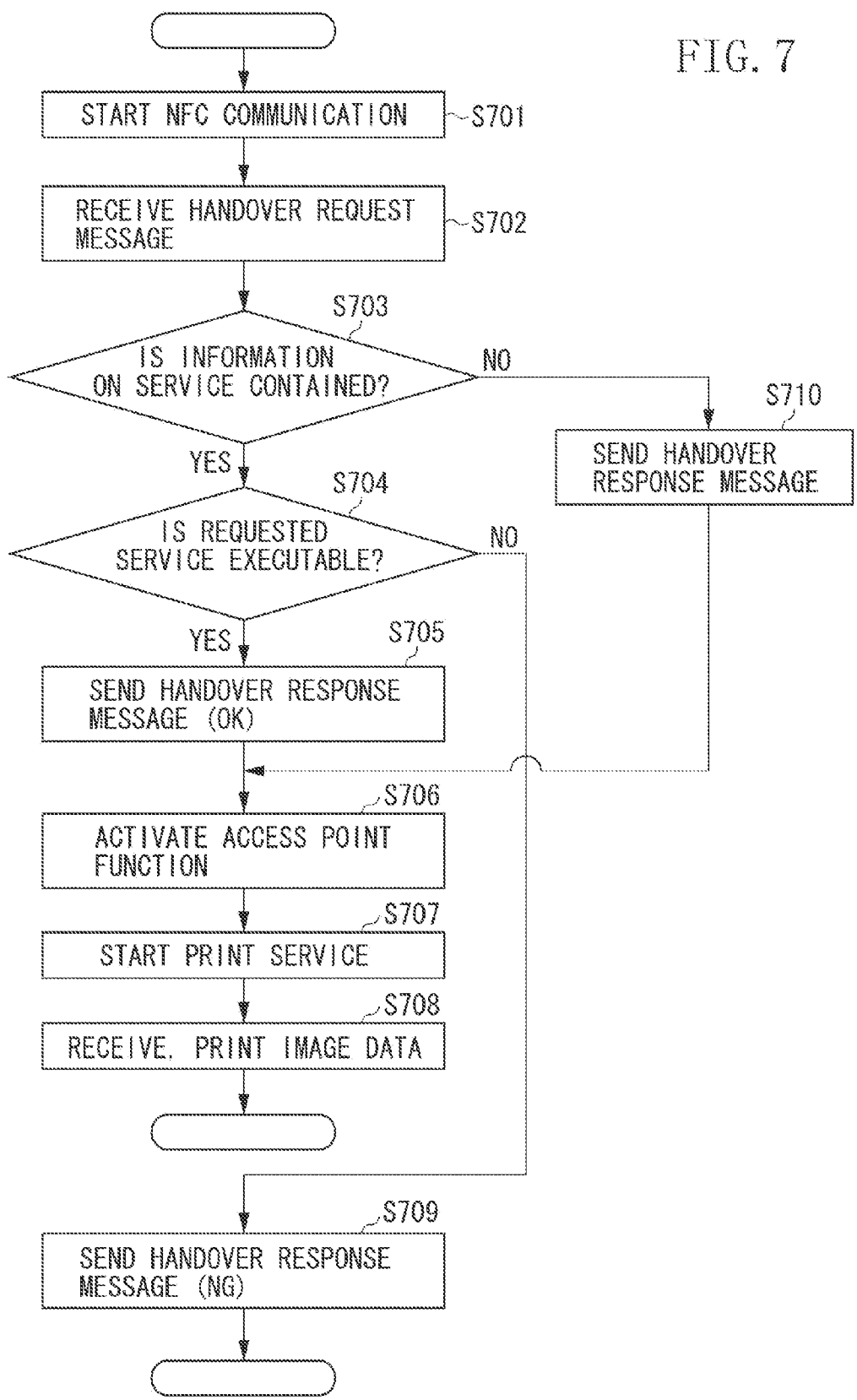
FIG. 7 illustrates an operation flow of a communication apparatus (printer) in the first exemplary embodiment.

The flowchart of FIG. 7 illustrates the operation procedure performed by the printer 102 when the digital camera 101 and the printer 102 are closely placed to each other.

In step S701, the printer 102 establishes communication with the digital camera 101 in the NFC method, if the NFC communication control unit 520 detects that the NFC communication unit 210 of the digital camera 101 is present nearby. Next, in step S702, the NFC communication control unit 520 receives the handover request message from the digital camera 101 in the NFC communication method. If the received handover request message contains information about a service (YES in S703), the service control unit 530 determines in step S704 whether the service control unit 530 can execute the service. If the service can be executed (YES in S704), the NFC communication control unit 520, in step S705, adds information indicating that the service can be executed, to the handover response message, which is then sent to the digital camera 101. On the other hand, if the service cannot be executed (NO in S704), the NFC communication control unit 520, in step S709, adds information indicating that the service cannot be executed, to the handover response message, which is then sent to the digital camera 101. Then, the process ends. Furthermore, if the received handover request message does not contain information about a service (NO in S703), the NFC communication control unit 520 sends, in step S710, the handover response message that does not contain information indicating whether the service is executable or unexecutable, to the digital camera 101. Furthermore, the NFC communication control unit 520 includes a connection parameter of the wireless LAN network that is used at the time of execution of the service, in the handover response message to be sent in step S705 or step S710.

Subsequently, in step S706, the wireless LAN communication control unit 510 activates the access point function and generates a wireless LAN network that corresponds to the connection parameter included in the response message. Furthermore, in step S707, the service control unit 530 starts to await a print service or print services that the service control unit 530 supports. If information about a print service is specified in the handover request message received in step S702, the printer 102 starts to await the specified print service. If information about a print service is not specified in the handover request message received in step S702, the printer 102 starts a process of awaiting all the print services that the printer 102 supports. Information about services that the printer 102 starts to await is notified on the wireless LAN network created in step S706, so that the information about the services can be retrieved from other communication apparatuses on the wireless LAN network.

Then, in step S708, if image data is sent from the digital camera 101, the print control unit 540 receives and prints the data.

Figure 8:
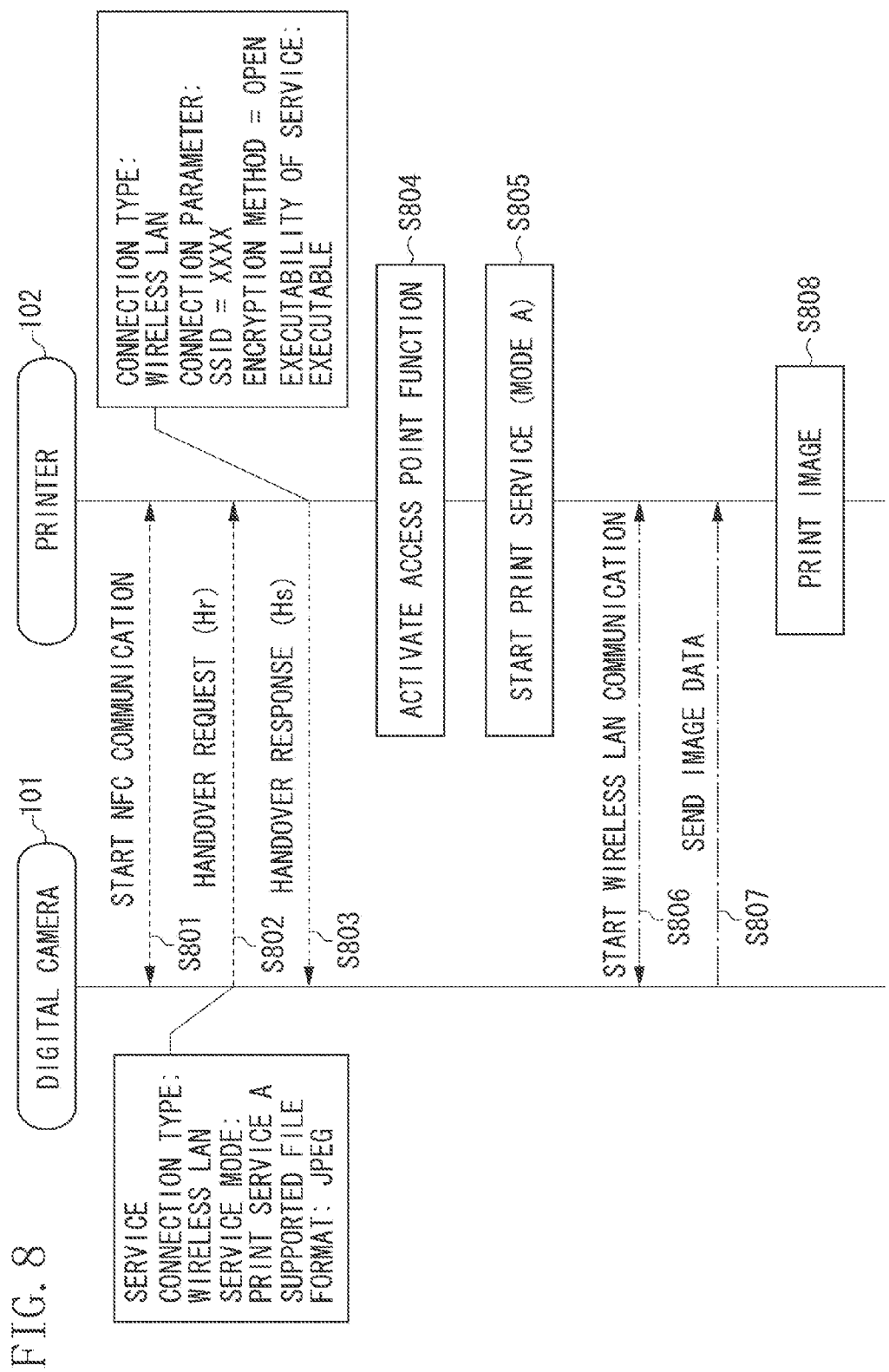
FIG. 8 illustrates an example of a communication sequence between a digital camera and a printer in the first exemplary embodiment.

Next, an example of a communication sequence between the digital camera 101 and the printer 102 will be described in detail with reference to FIG. 8. Referring to FIG. 8, firstly, in step S801, as the user closely places the digital camera 101 and the printer 102 to each other, the NFC communication is established between the two apparatuses. Next, in step S802, the digital camera 101 sends the handover request message to the printer 102 in the NFC communication method. The handover request message includes added information indicating that the digital camera 101 desires that a JPEG file be printed in the wireless LAN communication method by using the "print service A" mode. In in step S803, the printer 102 sends a handover response message to the digital camera 101 in the NFC communication method. The handover response message contains information as to whether the service indicated in the received handover request message is executable, and the connection parameter of the wireless LAN network that the printer 102 generates Since the services that the printer 102 supports are the "print service A", the "print service C" and the "print service D" as mentioned above, in this case, the printer 102 sends the handover response message that contains information indicating that the service is executable, to the digital camera 101 in the NFC communication method. Subsequently, in step S804, the printer 102 activates the access point function to generate a wireless LAN network that corresponds to the connection parameter sent in step S803. Furthermore, in step S805, the printer 102 starts a process of awaiting the print service according to the "print service A".

On the other hand, the digital camera 101, in step S806, activates the wireless LAN communication unit 308 to search for and connects to the wireless LAN network that corresponds to the received connection parameter. In step S807, after the connection to the wireless LAN network is completed, the digital camera 101 sends image data desired to be printed according to the procedure of the print service A, to the printer 102 via the wireless LAN network. In step S808, the printer 102 prints the received image data.

In the foregoing exemplary embodiment, the handover request message sent from the digital camera 101 to the printer 102 contains information about only one service. However, the present invention does not limit information to one service.

That is, information about two or more services may be contained in the handover request message. For example, the handover request message to be sent may contain information about two or more services together with information indicating whether execution of all the services is requested (AND) or any information about only one service may be executed (OR).

As described above, according to this exemplary embodiment, the service information is added to the handover request message, so that the apparatuses that communicate with each other can share the information about services before the handover. Furthermore, since the apparatuses that communicate with each other share the service information before the handover, the handover process can be restrained if a communication partner does not support the desired service. Therefore, it is possible to carry out the process of handover from the NFC to a wireless LAN or Bluetooth (registered trademark) only when necessary. Furthermore, the process of connecting to a wireless LAN generally takes a time of about several seconds to over a dozen seconds.

Therefore, by restraining unnecessary handovers, a useless amount of time is not wasted.

In the first exemplary embodiment, a message indicating the services that the service-employing apparatus can use is sent to the service-providing apparatus as an example of the method for sharing information of a service to be carried out by using the NFC communication method. A second exemplary embodiment will be illustrated below as an example of a method in which a service-providing apparatus sends information about services that the apparatus supports, to a service-using apparatus. Thus, the service-providing apparatus and the service-employing apparatus can agree on a service to be carried out. The construction of the communication system in this exemplary embodiment is substantially the same as in the first exemplary embodiment. Operations of the communication system in this exemplary embodiment will be described in detail with reference to FIGS. 9 to 11.

Figure 9:
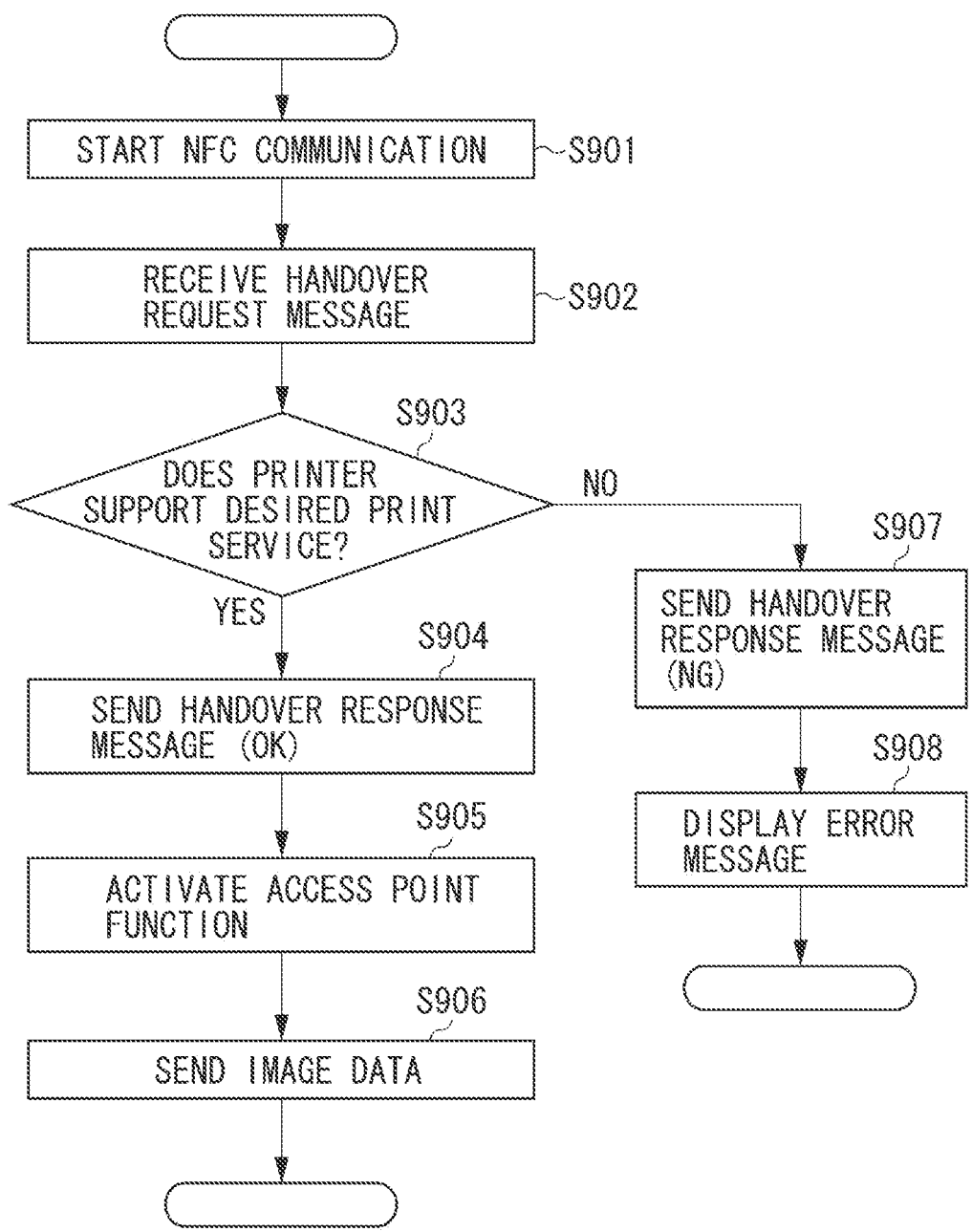
FIG. 9 illustrates an operation flow of a communication apparatus (digital camera) in a second exemplary embodiment.

The flowchart of FIG. 9 illustrates an operation procedure performed by the digital camera 101 when the digital camera 101 and the printer 102 are closely placed to each other.

In step S901, the NFC communication control unit 420 of the digital camera 101 establishes communication with the printer 102 in the NFC method, upon detecting that the NFC communication unit 309 of the printer 102 is present nearby. Subsequently, in step S902, the NFC communication control unit 420 receives the handover request message from the printer 102 in the NFC communication method. Then, the NFC communication control unit 420 analyzes the content of the message. The handover request message contains identifiers of the services that the printer 102 supports and accompanying information. If the received handover request message contains information about the service that the digital camera 101 should execute (YES in S903), the NFC communication control unit 420 includes information indicating that the notified service is to be executed, in a response message, and sends the response message to the printer 102 in step S904. Furthermore, the digital camera 101 also includes in the response message the connection parameter of the wireless LAN network that is to be used at the time of execution of the service.

Subsequently, in step S905, the digital camera 101 activates the access point function via the wireless LAN communication control unit 410 to generate a wireless LAN network that corresponds to the connection parameter included in the response message. In step S906, after waiting, when the printer 102 connects to the wireless LAN network, the digital camera 101 sends image data to be printed to the printer 102, according to a procedure of the desired one of the services indicated in the handover request message received in step S902. On the other hand, if the handover request message does not contain a desired service (NO in S903), the digital camera 101, in step S907, sends to the printer 102 a response message that contains information indicating that no service is to be executed. Then, in step S908, the digital camera 101 displays an error message.

Figure 10:
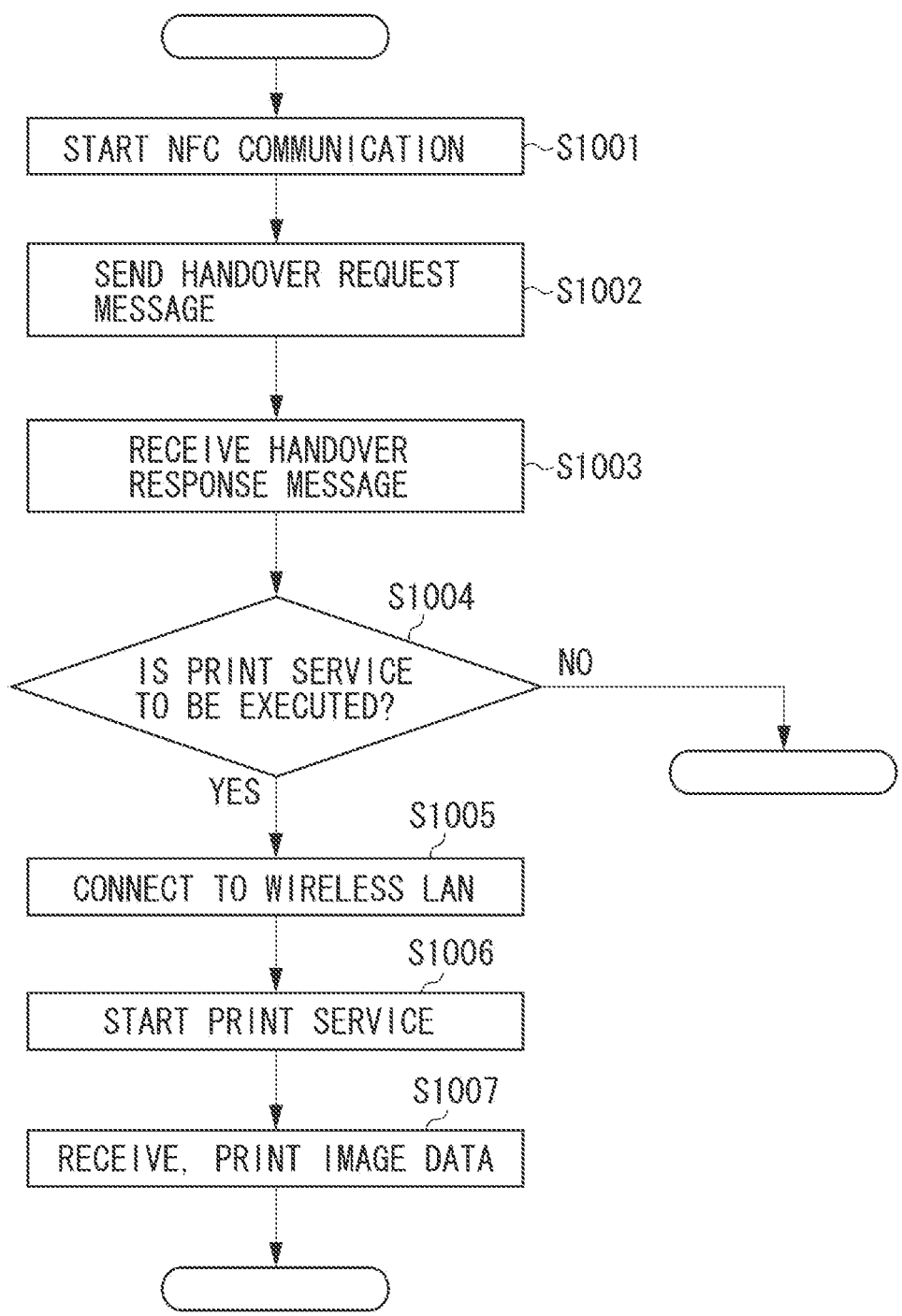
FIG. 10 illustrates an operation flow of a communication apparatus (printer) in the second exemplary embodiment.

The flowchart of FIG. 10 illustrates an operation procedure performed by the printer 102 when the digital camera 101 and the printer 102 are closely placed to each other. In step S1001, upon detecting that the NFC communication unit 210 of the digital camera 101 is nearby present, the NFC communication control unit 520 of the printer 102 establishes communication with the digital camera 101 in the NFC communication. Next, in step S1002, NFC communication control unit 520 sends a handover request message that contains information about identifiers of the services that the printer 102 supports, to the digital camera 101 in the NFC communication. As mentioned above, in this exemplary embodiment, the printer 102 supports three print services, that is, the "print service A", the "print service C" and the "print service D". Therefore, the handover request message contains information about these three services.

Subsequently, in step S1003, the NFC communication control unit 520 receives a response message from the digital camera 101 in the NFC communication. Then, the NFC communication control unit 520 analyzes the content of the message. If the received response message contains information indicating that the digital camera 101 is to execute a service (YES in S1004), the wireless LAN communication control unit 510, in step S1005, connects to a wireless LAN network according to the connection parameter contained in the response message. After the connection to the wireless LAN network is completed, the print control unit 540, in step S1006, starts awaiting the print service indicated in the handover response message sent in step S1002. Then, in step S1007, the print control unit 540 receives and prints image data from the digital camera 101. On the other hand, if the received response message contains information indicating that the digital camera 101 is not to execute a service (NO in S1004), the printer 102 ends the process without carrying out a handover to the wireless LAN.

Figure 11:
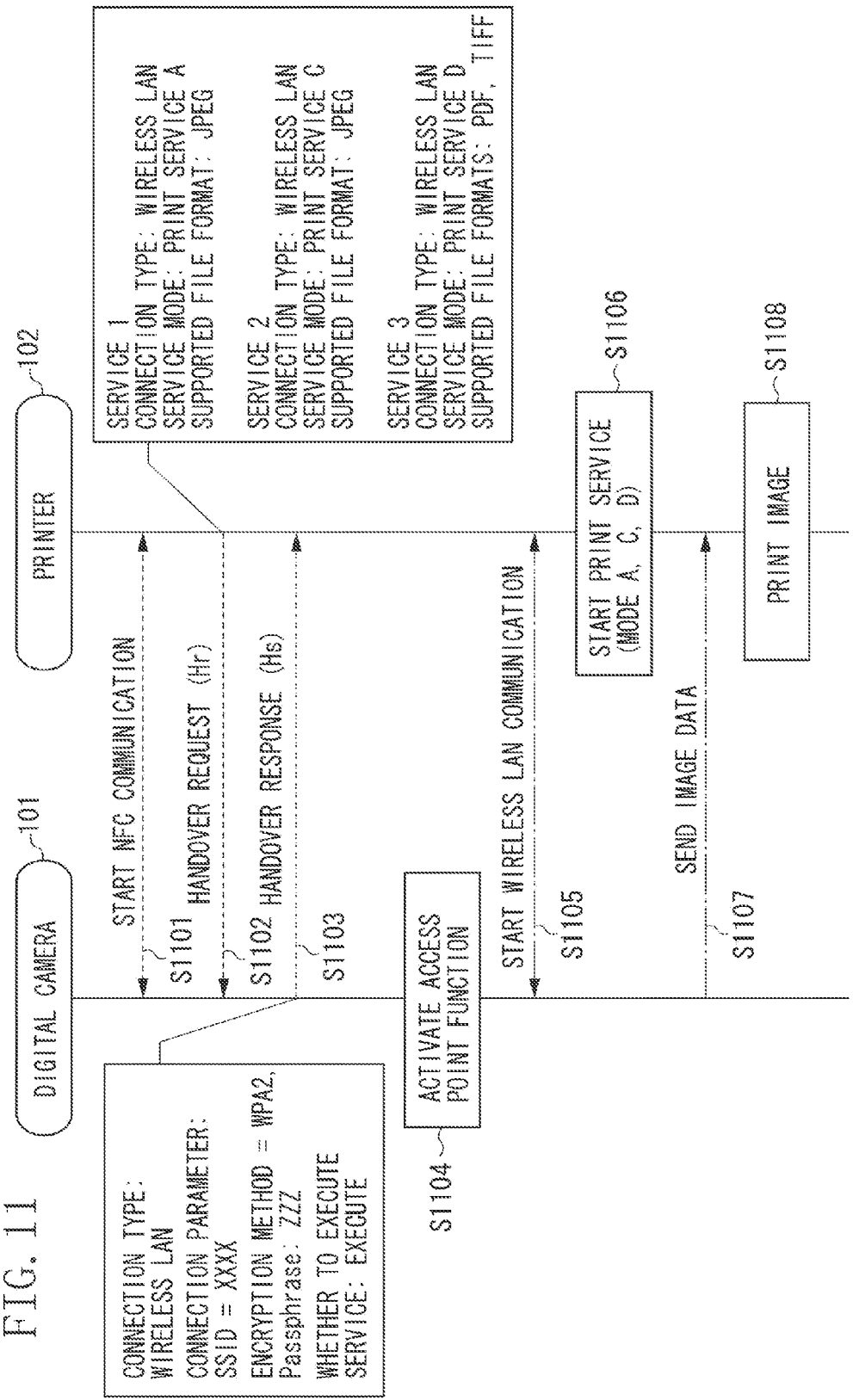
FIG. 11 illustrates a communication sequence for communication between a digital camera and a printer in the second exemplary embodiment.

An example of a communication sequence between the digital camera 101 and the printer 102 will be described in detail with reference to FIG. 11.

Firstly, in step S1101, the NFC communication between the digital camera 101 and the printer 102 is established by closely placing the two apparatuses. Next, in step S1102, the printer 102 sends the handover request message to the digital camera 101. The request message includes added information indicating that the printer 102 supports the "print service A", the "print service C" and the "print service D". The request message also includes added information indicating that JPEG files can be printed in the "print service A" and the "print service C" and files in Portable Document Format (PDF) and Tagged Image File Format (TIFF) can be printed in the "print service D". Furthermore, the request message includes information indicating that each of these print services can be executed by using the wireless LAN communication. In step S1103, the digital camera 101 which has received the handover request message, sends to the printer 102 a handover response message that includes added information indicating that the service notified in step S1102 is to be executed. The response message also contains the connection parameter of the wireless LAN network that the digital camera 101 generates. Subsequently, in step S1104, the digital camera 101 activates the access point function and generates a wireless LAN network that conforms to the wireless LAN network information sent in step S1103. Then, the digital camera 101 awaits connection with the printer 102. In step S1105, the printer 102 which has received the handover response message sent in step S1103, searches for the wireless LAN network indicated in the message, and connects to the wireless LAN network found. After completing connection to the wireless LAN network, the printer 102, in step S1106, starts a process of awaiting the print service in the "print service A" mode, the "print service C" mode or the "print service D" mode.

The digital camera 101, after detecting in step S1105 that the printer 102 has connected to the wireless LAN network, sends, in step S1107, image data desired to be printed according to the procedure of the print service A. In step S1108, the printer 102 prints the received image data.

As described above, according to the present exemplary embodiment, information about the services that can be provided to a user, is added to the handover request message, so that the apparatuses that communicate with each other can share the information about the services before the handover. Furthermore, since the apparatuses that communicate with each other share the service information before the handover, the handover process can be restrained if a communication partner does not support the desired service. Therefore, it is possible to carryout the process of handover from the NFC to the wireless LAN or Bluetooth (registered trademark) only when necessary. Furthermore, the process of connecting to the wireless LAN generally takes a time of about several seconds to more than a dozen seconds. Therefore, unnecessary handovers can be eliminated and a useless amount of time is not wasted.

The above-described exemplary embodiments are mere examples. The present invention is not limited to the exemplary embodiment illustrated in the specification and the drawings, but can be carried with various modifications without changing the gist of the invention.

Although in the foregoing descriptions of the exemplary embodiments, the handover from the NFC is limited to the handover to the wireless LAN communication, the invention is not limited to that handover. For example, the handover may be made to the communication in Bluetooth (registered trademark).

Furthermore, in the foregoing exemplary embodiments, the method in which the wireless LAN communication is performed with one of the two communication apparatuses serving as an access point which sends a connection parameter to another communication apparatus has been illustrated as an example. However, the present invention is not limited to that type. That is, communication may be performed via an external access point, or performed in an ad hoc mode. Furthermore, the communication apparatuses that communicate with each other may perform the wireless LAN communication by carrying out a connection procedure according to the Wireless Fidelity (Wi-Fi) Direct.

Furthermore, although the exemplary embodiments as described above are the system configured of the digital camera 101 and the printer 102, other appliances may also be used to perform the processes described above. Furthermore, the information about services that is sent and received between the communication apparatuses do not need to be limited to the services related to printing. For example, information regarding services, such as image transmission services, moving image reproduction services, image scanning services, etc., may be sent and received between the communication apparatuses. Furthermore, pieces of information about such services may be sent and received all together.

Furthermore, in the foregoing exemplary embodiments, in order to notify that the services indicated in the handover request message are not to be executed, the information indicating that the services are not to be executed is included in the handover response message. However, the present invention is not limited to that method. That is, as long as the communication apparatus having sent the handover request message can detect that the services indicated in the handover request message are not to be executed at the receiver end, any method may be employed. For example, the apparatus having received the handover request message may notify that the services indicated in the handover request message are not to be executed, by not sending a handover response message, or by sending a message different from the Handover Select message.

Furthermore, although in the exemplary embodiments, the identifier of each service sent and received in the NFC communication is an integer value that is uniquely associated with the service, the present invention is not limited to such information. For example, the identifier of a service may be character string information, such as the name of the service. Furthermore, the identifiers of services may be identification information that can be associated with a set of two or more services.

Although in the exemplary embodiments, the handover request message contains information about the services that the communication apparatus is capable of executing, information about other services (services that the communication apparatus is incapable of executing) may also be included in the handover request message.

Furthermore, although in the exemplary embodiments, the handover from the NFC to a different communication method is described as an example, the handover may also be, for example, a handover from Bluetooth (registered trademark) to a different communication method.

The present invention can also be realized by executing a process described below. In this process, software (program) that realizes the functions of the exemplary embodiments described above is supplied to a system or an apparatus via a network or various storage media, and a computer (a CPU, a micro-processing unit (MPU), etc.) of the system or the apparatus reads and executes a program.

According to this exemplary embodiment, the apparatuses that communicate with each other can share information about services before the handover.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A communication apparatus comprising:
a first communication interface configured to perform communication based on a first wireless communication protocol;

a second communication interface configured to perform communication based on a second wireless communication protocol, the first wireless communication protocol having a slower communication speed than the second wireless communication protocol or being shorter in communication distance than the second wireless communication protocol;

one or more processors; and one or more memories storing instructions that, when executed by the one or more processors, cause the communication apparatus to perform operations comprising:

transmitting via the first communication interface a request message for requesting for connection based on the second wireless communication protocol to another apparatus, wherein, in a case where communication with the another apparatus has been started by the first communication interface in a state in which a service that is to be executed via the second communication interface and accompanying information about the service have been selected, the communication apparatus includes in the request message transmitted to the another apparatus, information about the service and the accompanying information, and wherein, in a case where communication with the another apparatus has been started by the first communication interface in a state in which a service that is to be executed via the second communication interface and accompanying information about the service have not been selected, the communication apparatus does not include in the request message transmitted to the another apparatus, information about the service and the accompanying information.

2. The communication apparatus according to claim 1, wherein the service includes at least any of a print service, an image transmission service, a moving image reproduction service, and an image scanning service.

3. The communication apparatus according to claim 1, wherein the second communication interface, after connecting to the another communication apparatus by using a connection parameter that is included in a response of the another communication apparatus to the request message, performs a communication with the another communication apparatus to execute the service.

4. The communication apparatus according to claim 1, wherein, in a case where a plurality of services has been selected, the request message includes information about each of the plurality of services.

5. The communication apparatus according to claim 1, wherein the request message includes information about a service that the communication apparatus is able to provide or information about a service that the communication apparatus is able to use.

6. The communication apparatus according to claim 1, the operations performed by the communication apparatus, further comprising:

determining whether to perform communication with the another communication apparatus via the second communication interface or not on a basis of a response of the another communication apparatus to the request message.

7. The communication apparatus according to claim 6, wherein the determining determines that communication is to be performed via the second communication interface in a case where the response of the another communication apparatus to the request message includes information indicating that the service indicated by the information about the service is executable by the another apparatus.

8. The communication apparatus according to claim 6, the operations performed by the communication apparatus, further comprising:

notifying a user of an error in a case of determination by the determining the communication via the second communication interface is not to be performed.

9. The communication apparatus according to claim 1, wherein the first communication interface performs the communication through NFC (Near Field Communication).

10. The communication apparatus according to claim 1, wherein the second communication interface performs the communication using wireless communication based on IEEE802.11 series.

11. The communication apparatus according to claim 1, wherein the request message is a handover request message prescribed by an NFC Forum.

12. The communication apparatus according to claim 1, wherein the second communication interface connects to the another communication apparatus on a basis of a connection parameter that is shared in the communication of the request message and a response message to the request message via the first communication interface; and wherein the connection parameter includes at least one of an SSID, an encryption key, an encryption method, an authentication key, an authentication method, and a MAC address.

13. The communication apparatus according to claim 1, wherein the request message includes information indicating the second communication protocol and information about the service.

14. The communication apparatus according to claim 1, wherein the service is a print service, and the accompanying information is at least one of a print sheet size, a print color, and a presence or absence of two-sided printing.

15. A method comprising:

performing, at a first communication interface, communication based on a first wireless communication protocol;

performing, at a second communication interface, communication based on a second wireless communication protocol, the first wireless communication protocol having a slower communication speed than the second wireless communication protocol or being shorter in communication distance than the second wireless communication protocol; and transmitting, via the first communication interface, a request message for requesting for connection based on the second wireless communication protocol to another apparatus, wherein, in a case where communication with the another apparatus has been started by the first communication interface in a state in which a service that is to be executed via the second communication interface and accompanying information about the service have been selected, the communication apparatus includes in the request message transmitted to the another apparatus, information about the service and the accompanying information, and wherein, in a case where communication with the another apparatus has been started by the first communication interface in a state in which a service that is to be executed via the second communication interface and accompanying information about the service have not been selected, the communication apparatus does not include in the request message transmitted to the another apparatus, information about the service and the accompanying information.

16. A non-transitory computer readable storage medium storing instructions that, when executed, cause a communication apparatus to perform a process comprising:
   performing, at a first communication interface, communication based on a first wireless communication protocol;
   performing, at a second communication interface, communication based on a second wireless communication protocol, the first wireless communication protocol having a slower being lower in communication speed than the second wireless communication protocol or being shorter in communication distance than the second wireless communication protocol; and
   transmitting, via the first communication interface, a request message for requesting for connection based on the second wireless communication protocol to another apparatus,
   wherein, in a case where communication with the another apparatus has been started by the first communication interface in a state in which a service that is to be executed via the second communication interface and accompanying information about the service have been selected, the communication apparatus includes in the request message transmitted to the another apparatus, information about the service and the accompanying information, and
   wherein, in a case where communication with the another apparatus has been started by the first communication interface in a state in which a service that is to be executed via the second communication interface and accompanying information about the service have not been selected, the communication apparatus does not include in the request message transmitted to the another apparatus, information about the service and the accompanying information.

* * * * *